(12) United States Patent
Bolotnikoff (10) Patent No.: US 9,733,904 B2
(45) Date of Patent: Aug. 15, 2017

(54) CONTENT-AWARE CODE FRAGMENTS

(71) Applicant: David Lotan Bolotnikoff, Tzur Moshe (IL)

(72) Inventor: David Lotan Bolotnikoff, Tzur Moshe (IL)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/566,290

(22) Filed: Dec. 10, 2014

(65) Prior Publication Data
US 2015/0169296 A1   Jun. 18, 2015

Related U.S. Application Data

(60) Provisional application No. 61/915,208, filed on Dec. 12, 2013.

(51) Int. Cl.
*G06F 9/44* (2006.01)

(52) U.S. Cl.
CPC . *G06F 8/35* (2013.01); *G06F 8/30* (2013.01)

(58) Field of Classification Search
CPC ..... G06F 8/00; G06F 8/35; G06F 8/71; G06F 8/314; G06F 9/4446; G06F 17/21; G06F 17/30014; G06F 17/30404; G06F 8/33
See application file for complete search history.

(56) References Cited

U.S. PATENT DOCUMENTS

| | | | | |
|---|---|---|---|---|
| 6,724,401 B1* | 4/2004 | Hennum | ............... | G06F 9/4446 715/762 |
| 7,490,292 B2* | 2/2009 | Hennum | .................. | G09B 5/00 715/711 |
| 2004/0261016 A1* | 12/2004 | Glass | ................ | G06F 17/30014 715/230 |
| 2005/0114771 A1* | 5/2005 | Piehler | .................... | G06F 17/21 715/264 |
| 2010/0229150 A1* | 9/2010 | Stone | ........................ | G06F 8/00 717/104 |
| 2010/0269094 A1* | 10/2010 | Levenshteyn | ............ | G06F 8/35 717/109 |
| 2012/0159459 A1* | 6/2012 | Turner | .................... | G06F 8/314 717/138 |
| 2013/0339365 A1* | 12/2013 | Balasubramanian | ..... | G06F 8/71 707/741 |

OTHER PUBLICATIONS

Granger, "Light Table," [retrieved online on Oct. 21, 2014] https://www.kickstarter.com/projects/ibdknox/light-table, 17pages.

* cited by examiner

*Primary Examiner* — Tuan Vu
(74) *Attorney, Agent, or Firm* — Fish & Richardson P.C.

(57) ABSTRACT

Methods, systems, and computer-readable storage media for selecting columns for supporting user interaction with code fragments of source code based on respective content of the code fragments. In some implementations, actions include receiving a first code fragment, the first code fragment including first content, associating a first set of functions with the first code fragment, the first set of functions including one or more functions based on the first content, and displaying one or more functions of the first set of functions for selection by a user.

20 Claims, 5 Drawing Sheets

CONTENT-AWARE CODE FRAGMENTS

CROSS-REFERENCE TO RELATED APPLICATIONS

This application claims priority to U.S. Provisional App. No. 61/915,208 filed on Dec. 12, 2013, the disclosure of which is expressly incorporated herein by reference in its entirety.

BACKGROUND

Traditional software development can involve developers working in multiple structures, which can include an application structure and a file structure. In some examples, the application structure is the logical structure of a software application (e.g., entities, classes, actions), and the file structure is how components of the software application are stored. Physical persistency (e.g., the file structure) impacts development practices. For example, development activities, such as coding and refactoring, requires a developer to move between files and memorize code. This interplay between the application structure and the file structure can inhibit efficient software development.

SUMMARY

Implementations of the present disclosure include computer-implemented methods for supporting user interaction with code fragments of source code based on respective content of the code fragments. In some implementations, actions include receiving a first code fragment, the first code fragment including first content, associating a first set of functions with the first code fragment, the first set of functions including one or more functions based on the first content, and displaying one or more functions of the first set of functions for selection by a user. Other implementations of this aspect include corresponding systems, apparatus, and computer programs, configured to perform the actions of the methods, encoded on computer storage devices.

These and other implementations can each optionally include one or more of the following features: actions further include providing the first code fragment for display, and selectively providing one or more functions of the first set of functions for display with the code fragment; actions further include receiving user input associated with a function of the first set of functions, and executing the function in response to receiving the first user input; the first code fragment defines an entity that includes one or more elements, and the first set of functionalities includes an add element function; the first code fragment defines an entity that includes an element that can have an association to one or more other elements, and the first set of functionalities includes an add association function; the first set of functionalities includes an add action function; actions further include receiving a second code fragment, the second code fragment including second content, and associating a second set of functions with the second code fragment, the second set of functions including one or more functions based on the second content; the second set of functions is different from the first set of functions; actions further include receiving user input, and, in response to the user input, defining an association between an element of the first code fragment and the second code fragment; and the first set of functions includes an activate function.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to providing content-aware code fragments. More particularly, implementations of the present disclosure enable users (e.g., developers) to select one or more code fragments (e.g., for editing) to provide a custom work environment. That is, the developer can select one or more code fragments, which are provided as respective portions of a larger body of source code, and can view and interact with the code fragments. In accordance with implementations of the present disclosure, each code fragment can be content-aware. More specifically, for each code fragment a set of functions can be provided based on the content of the respective code fragment. For example, a first code fragment can include a first set of functions associated therewith based on content of the first code fragment, and a second code fragment can include a second set of functions associated therewith based on content of the second code fragment, where the first set of functions is different from the second set of functions. Implementations of the present disclosure make the interplay between the application structure and the file structure transparent to the developer. In this manner, software development can be more efficient.

Figure 1:
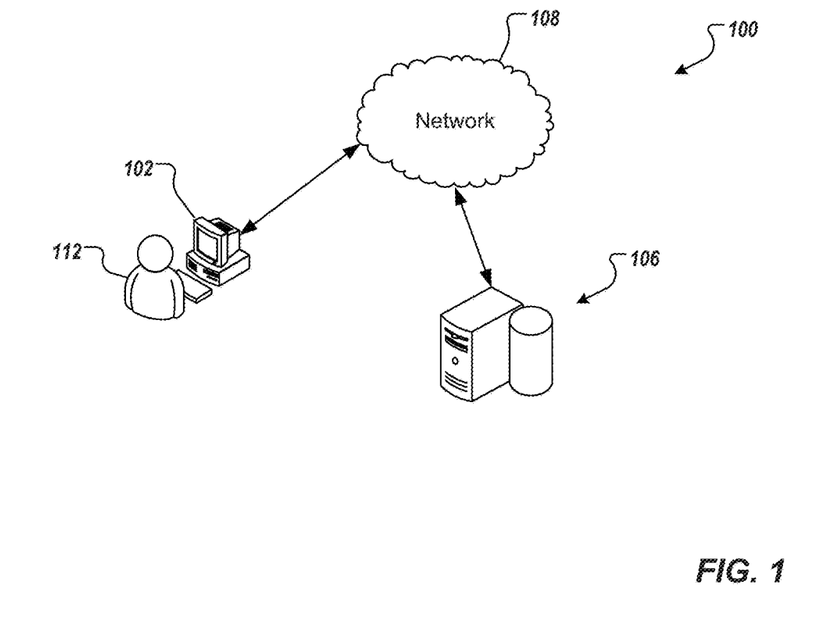
FIG. 1 depicts an example high-level architecture in accordance with implementations of the present disclosure.

FIG. 1 depicts an example architecture 100 in accordance with implementations of the present disclosure. In the depicted example, the architecture 100 includes a client device 102 communicably connected to a back-end system 106 by a network 108. The client device 102 is operated by a user 112. In some examples, the client device 102 can be a computing device such as a laptop computer, a desktop computer, a smartphone, a personal digital assistant, a portable media player, a tablet computer, or any other appropriate computing device that can be used to communicate with the back-end system 106. In some examples, the back-end system 106 can include one or more computing devices such as a computer server. In some examples, the back-end system 106 can represent more than one computing device working together to perform the actions of a server computer (e.g., cloud computing). In some examples, the network 108 can be a public communication network (e.g., the Internet, cellular data network, dialup modems over a telephone network) or a private communications network (e.g., private LAN, leased lines). Although a single computing device 102 is depicted in FIG. 1, it is contemplated that multiple computing devices can be provided and can communicate with the back-end system 106 (e.g., through the network 108).

In accordance with implementations of the present disclosure, the back-end system 106 can host one or more applications. In some examples, the back-end system 106 can provide an integrated development environment (IDE) that users can access to create, edit and store source code. For example, the user 112 can use the computing device 102 to access the IDE over the network 108. In some examples, the IDE provides comprehensive facilities to developers for software development. Example IDEs can include a source code editor, build automation tools, a debugger, a compiler and/or an interpreter.

In some examples, source code can be provided in a particular programming language. An example programming language includes SAP River, provided by SAP AG of Walldorf, Germany. In general, SAP River (also referred to as the River Definition Language (RDL)) enables users (e.g., developers) to provide source code that describes an entity relationship model, associated behaviors, and other aspects for an application at a high level. A compiler, such as an RDL compiler, processes the source code to provide suitable artifacts for implementing the application on an underlying platform.

In some examples, an application includes a respective application object that includes all types, entities, actions, views, roles, and other objects of the application therein. In some examples, action objects can be used to provide logic (e.g., business logic) to entities of the underlying application. For example, an action can take one or more parameters as input, and can return one or more values as output. In some examples, one or more namespaces can be provided, where namespaces enable the developer to group similar objects (e.g., entities or views) into logical sections. For example, namespaces can be used to organize the source code and to enable code fragments to be accessed (e.g., exposed to users for editing). In some examples, a code fragment can include a portion of a larger body of source code.

In some examples, an entity can be defined and can include one or more elements. In some examples one element can be provided as a key element. For example, an entity "Actor" can be provided with elements "name," "emailAddress," "age," "movies," "totalIncomeQ," and "totalIncome." Example source code can be provided as:

```
entity Actor {
    key element name: String;
    element emailAddress: String;
```

-continued

```
    element age: Integer;
    element movies: Association[0..*];
    element totalIncomeQ = SELECT ONE;
    element totalIncome: DecimalFloat;
}
```

In this example, the element "name" is the key of the entity "Actor." Further, the example source code can be descried as a code fragment. That is, the example source code above can be provided as a portion of a larger body of source code that is provided for the application.

In some examples, source code, or a code fragment can be activated (e.g., compiled and/or executed) to provide one or more artifacts. An example artifact includes a table. With reference to the example code fragment provided above, an example table can include columns associated with each element provided for the entity "Actor."

Implementations of the present disclosure will be discussed in detail with reference to features of RDL, discussed above. It is appreciated, however, that any appropriate programming language can be used with implementations of the present disclosure.

In accordance with implementations of the present disclosure, and as introduced above, a code fragment can be content-aware, such that a respective set of functions can be provided based on the content of the code fragment. In some examples, the set of functions associated with the code fragment can include one or more functions that are available for respective types of content. For example, it can be determined that a code fragment defines an entity. Consequently, a set of functions that can be executed for entities can be provided for the code fragment. As another example, it can be determined that a code fragment defines an action. Consequently, a set of functions that can be executed for actions can be provided for the code fragment. In some examples, the code fragment can reviewed to determine the content thereof. In some examples, the code fragment can include metadata associated therewith, the metadata indicating one or more types of content of the code fragment.

Figure 2A:
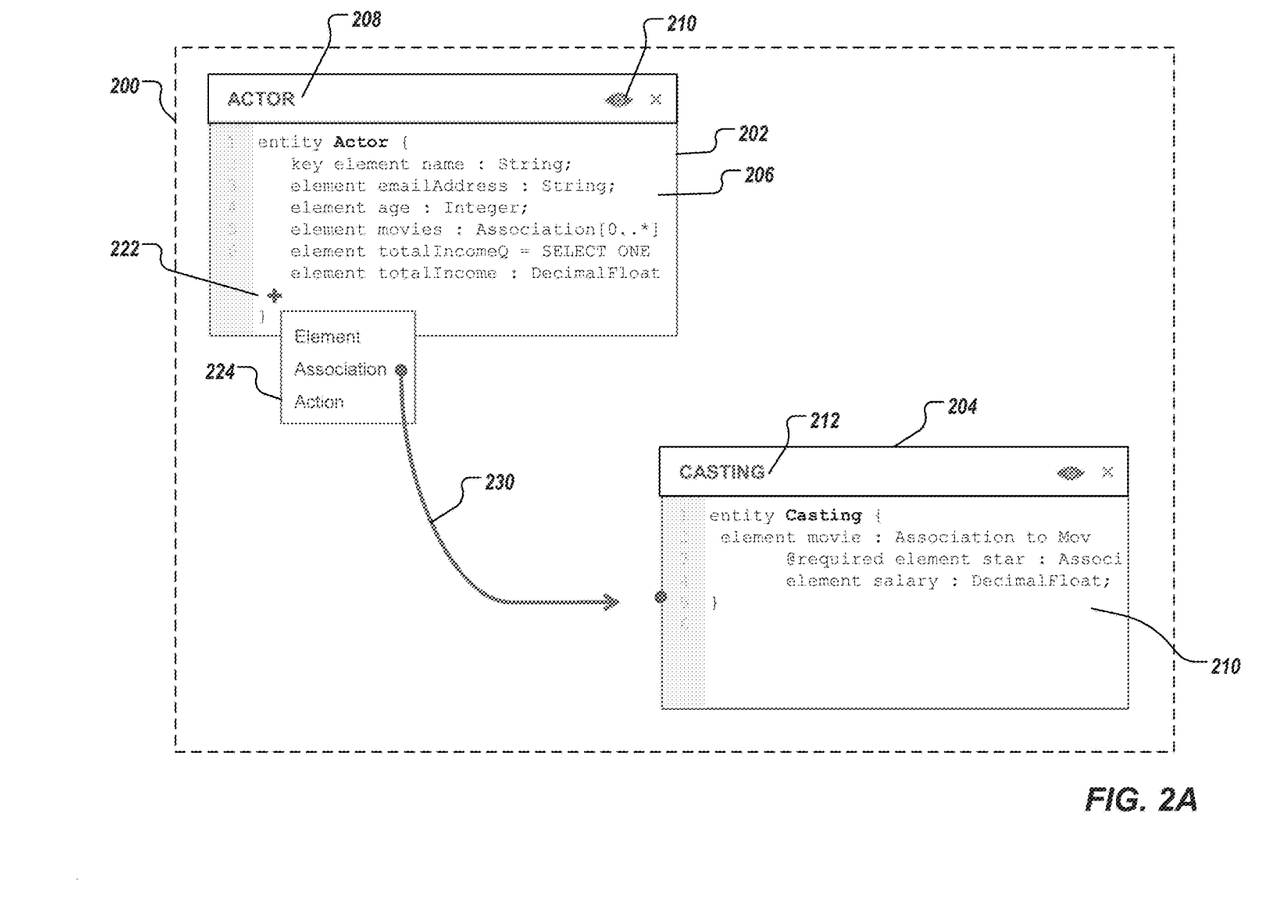
FIGS. 2A-2C depict example code fragments and respective interfaces in accordance with implementations of the present disclosure.

FIG. 2A depicts an example interface 200. In some examples, the interface 200 can be a portion of a larger interface. In some examples, the interface 200 can be displayed to a user on a computing device (e.g., to the user 112 on the computing device 102). In some examples, the interface 200 is provided by an IDE, and enables the user to interact with source code (e.g., create, edit, store, delete) using the IDE.

In the example of FIG. 2A, fragment interfaces 202, 204 are displayed within the interface 200. Although not depicted in FIG. 2A, the interface 200 can also display an outline of a subject application (e.g., the application, for which source code is being edited).

The fragment interface 202 includes a code fragment 206, and an entity title 208 indicating the entity, to which the code fragment 206 corresponds. The code fragment 206 of FIG. 2A includes the example code fragment provided above (e.g., for the entity "Actor"). The fragment interface 204 includes a code fragment 210, and an entity title 212 indicating the entity, to which the code fragment 210 corresponds. The code fragment 210 of FIG. 2A corresponds to an entity "Casting." As noted above, implementations of the present disclosure enable users to interact with one or more code fragments selected by the user. In this manner, the user is able to create a custom workspace, and is not required to work in the full body of the underlying source code.

In accordance with implementations of the present disclosure respective sets of functions can be provided for each code fragment 206, 210 based on content of the respective code fragments 206, 210. For example, code fragments associated with entities can include functions of "activate," "add element," and "add action." In the example of FIG. 2A, the content of the code fragment 206, being an entity, can provide that the set of functions for the code fragment 206 includes "activate," "add element," and "add action." Consequently, the fragment interface 202 includes an activate element 220 and an add element 222.

In some implementations, one or more functions in a set of functions can be provided for each code fragment 206, 210 based on content of both code fragments 206, 210. In the example of FIG. 2A, because both the code fragments 206, 210 are entities, the function "add association" can be provided. In this manner, an association can be added between entities displayed in the interface.

In some examples, and in response to user selection (e.g., clicking on) the activate element 220, an artifact resulting from the code fragment 206 can be displayed, as discussed in further detail below with reference to FIG. 2B. In some examples, and in response to user selection of the add element 222, a menu 224 is displayed. In some examples, the menu 224 depicts one or more options for adding (e.g., objects) to the code fragment 206. In the depicted example, the menu 224 includes an add element option, an add association option, and an add action option.

With continued reference to FIG. 2A, the user can select an add option from the menu 224. In the depicted example, the user has selected the add association option to add an association to the code fragment 206. More particularly, the entity "Casting," is added as an association to the entity "Actor." In this example, a foreign key relationship is being added between the entity "Actor" and the entity "Casting." In some examples, the user can select (e.g., click on) the desired option in the menu 224, and can drag the option to a target code fragment (e.g., the code fragment 210 in the depicted example. In FIG. 2A, a drag indicator 230 is depicted. It is contemplated, however, that the drag indicator need not actually be displayed in the interface 200.

Figure 2B:
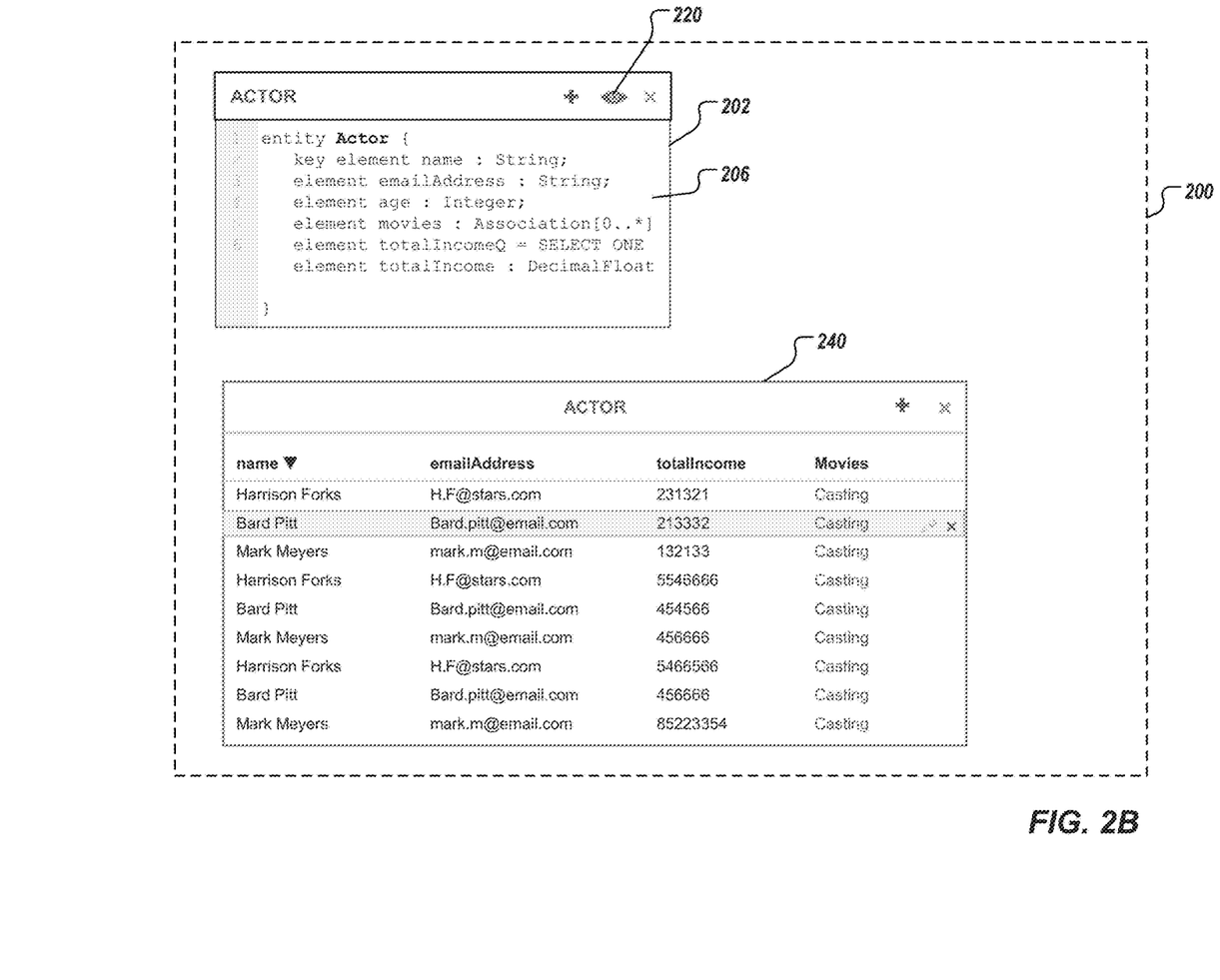

FIG. 2B depicts an example "activate" action based on the example of FIG. 2A. More particularly, and as discussed above with reference to FIG. 2A, an association between the code fragment 206 (e.g., the entity "Actor") and the code fragment 210 (e.g., the entity "Casting") was provided. In response to user selection (e.g., click on) the activate element 220, an artifact 240 of the fragment interface 202 is displayed. In the depicted example, the artifact 240 includes a table that includes a plurality of columns, each column corresponding to the respective element of the underlying entity (e.g., the entity "Actor"). In the example of FIG. 2B, the table 240 includes a column reflecting the element "Movies," and the cells of the column are filled with values for the entity "Casting," as a result of the added association that is described above with reference to FIG. 2A. In some examples, the artifact 240 is provided as a data preview (e.g., a preview of a table that would be provided during actual execution of the underlying application).

Figure 2C:
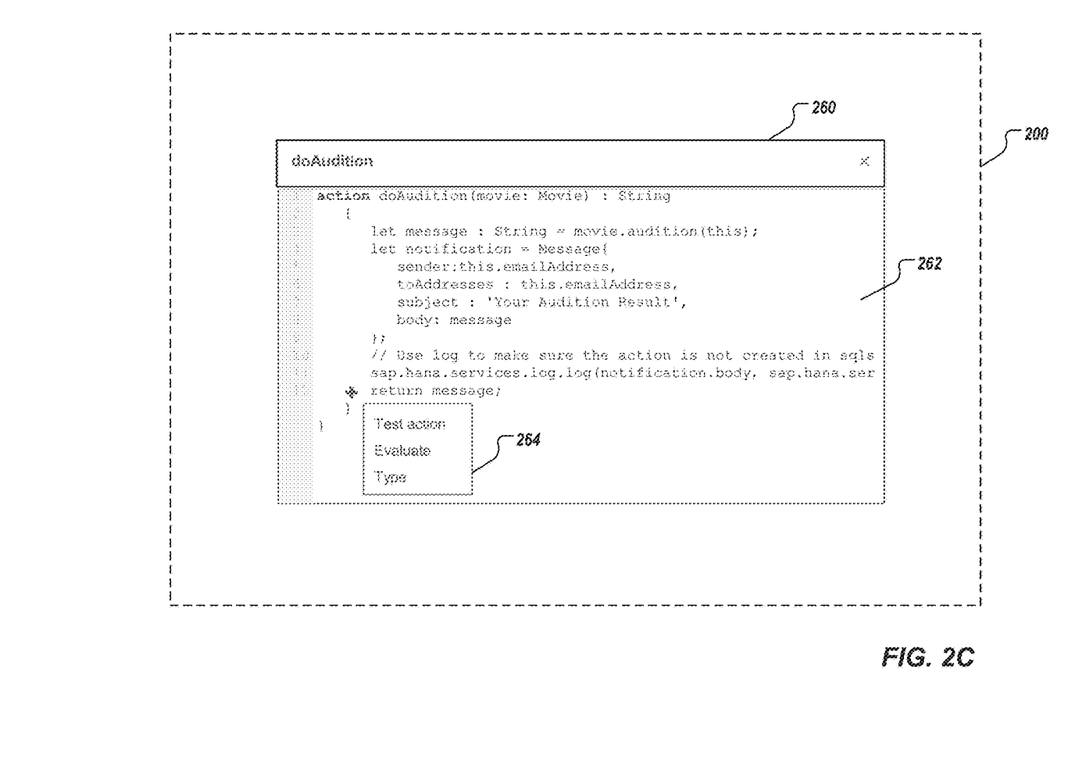

FIG. 2C depicts an example fragment interface 260 displayed in the interface 200. In the depicted example, the fragment interface 260 displays a code fragment 262 of an action "doAudition." In some examples, because the content of the code fragment 262 is an action, an activate element is not provided. For example, and as discussed above with reference to FIGS. 2A and 2B, an activate element is provided for code fragments of entities. Example functions that can be included in a set of functionalities for an action can include "test action," "evaluate," and "type." In the example of FIG. 2C, a menu 264 is displayed, which includes options for test action, evaluate, and type.

Figure 3:
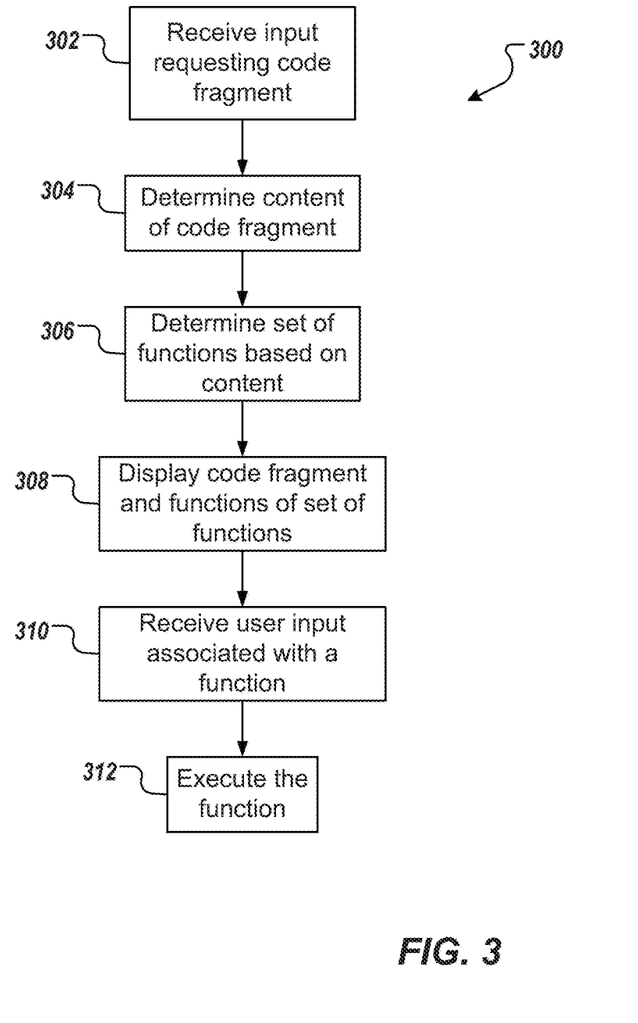
FIG. 3 depicts an example process that can be executed in accordance with implementations of the present disclosure.

FIG. 3 depicts an example process 300 that can be executed in accordance with implementations of the present disclosure. The example process 300 can be implemented, for example, within the example architecture 100 of FIG. 1. In some examples, the example process 300 can be provided by one or more computer-executable programs executed using one or more computing devices.

Input requesting a code fragment is received (302). For example, a user can provide input to an interface (e.g., the interface 200 of FIGS. 2A-2C) indicating a request to display a code fragment. Content of the code fragment is determined (304). For example, code within the requested code fragment can be reviewed to determine content (e.g., whether the code fragment defines an entity or an action). As another example, metadata associated with the code fragment can indicate the content thereof. A set of functions is determined for the code fragment based on the content (306). For example, if the content of the code fragment defines an entity, a first set of functions can be provided (e.g., activate, add element, add association, add action). As another example, if the content of the code fragment defines an action, a second set of functions can be provided (e.g., test action, evaluate, type).

The code fragment and functions of the set of functions are displayed (308). For example, the code fragment can be displayed in a fragment interface (e.g., the fragment interface 206, 210 of FIGS. 2A and 2B). User input associated with a function is received (310). In response to the user input, the function is executed (312). For example, and is discussed above with reference to FIGS. 2A and 2B, a function can include "add association," wherein, in the depicted example, an association is provided between the entity "Actor" and the entity "Casting" (e.g., a foreign key relationship).

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for supporting user interaction with code fragments of source code based on respective content of the code fragments, the method being executed using one or more processors and comprising:
   receiving, by the one or more processors, a first code fragment, the first code fragment being written in a source language expressing an entity relationship model, comprising first content and defining at least one of an entity, an action or a metadata, each of the entity, the action and the metadata comprising one or more member elements, the entity comprising properties of the one or more member elements and being configurable for use with or to be acted upon by the action, the action comprising the one or more member elements defining input and output parameters and being configurable to act on the entity, and the metadata comprising the one or more member elements indicating one or more types of content of the first code fragment and comprising a description related to the use of the entity and the action, at least one member element representing a key element expressed as a string indicating an identity of the first content;
   determining, by the one or more processors, the one or more types of content of the first code fragment by reviewing the first content of the first code fragment;
   associating, by the one or more processors, a first set of functions with the first code fragment, the first set of functions comprising one or more functions that are provided based on the one or more types of content; and
   displaying, by the one or more processors, one or more functions of the first set of functions for selection by a user.

2. The method of claim 1, further comprising:
   providing the first code fragment for display; and
   selectively providing one or more functions of the first set of functions for display with the code fragment.

3. The method of claim 1, further comprising:
   receiving user input associated with a function of the first set of functions; and
   executing the function in response to receiving first user input.

4. The method of claim 1, wherein the first set of functions comprises an add element function.

5. The method of claim 1, wherein the first code fragment defines the entity that comprises an element that can have an association to one or more other elements, and the first set of functions comprises an add association function.

6. The method of claim 1, wherein the first set of functions comprises an add action function.

7. The method of claim 1, further comprising:
   receiving a second code fragment, the second code fragment comprising second content; and
   associating a second set of functions with the second code fragment, the second set of functions comprising one or more functions based on the second content.

8. The method of claim 7, wherein the second set of functions is different from the first set of functions.

9. The method of claim 7, further comprising:
   receiving user input; and
   in response to the user input, defining an association between an element of the first code fragment and the second code fragment.

10. The method of claim 1, wherein the first set of functions comprises an activate function.

11. A non-transitory computer-readable storage medium coupled to one or more processors and having instructions stored thereon which, when executed by the one or more processors, cause the one or more processors to perform operations for supporting user interaction with code fragments of source code based on respective content of the code fragments, the operations comprising:
    receiving a first code fragment, the first code fragment being written in a source language expressing an entity relationship model, comprising first content and defining at least one of an entity, an action or a metadata, each of the entity, the action and the metadata comprising one or more member elements, the entity comprising properties of the one or more member elements and being configurable for use with or to be acted upon by the action, the action comprising the one or more member elements defining input and output parameters and being configurable to act on the entity, and the metadata comprising the one or more member elements indicating one or more types of content of the first code fragment and comprising a description related to the use of the entity and the action, at least one member element representing a key element expressed as a string indicating an identity of the first content;
    determining the one or more types of content of the first code fragment by reviewing the first content of the first code fragment;
    associating a first set of functions with the first code fragment, the first set of functions comprising one or more functions that are provided based on the one or more types of content; and
    displaying one or more functions of the first set of functions for selection by a user.

12. The computer-readable storage medium of claim 11, wherein operations further comprise:
    providing the first code fragment for display; and
    selectively providing one or more functions of the first set of functions for display with the code fragment.

13. The computer-readable storage medium of claim 11, wherein operations further comprise:
    receiving user input associated with a function of the first set of functions; and
    executing the function in response to receiving first user input.

14. The computer-readable storage medium of claim 11, wherein the first set of functions comprises an add element function.

15. The computer-readable storage medium of claim 11, wherein the first code fragment defines an entity that comprises an element that can have an association to one or more other elements, and the first set of functions comprises an add association function.

16. A system, comprising:
a computing device; and
a computer-readable storage device coupled to the computing device and having instructions stored thereon which, when executed by the computing device, cause the computing device to perform operations for supporting user interaction with code fragments of source code based on respective content of the code fragments, the operations comprising:
receiving a first code fragment, the first code fragment being written in a source language expressing an entity relationship model, comprising first content and defining at least one of an entity, an action or a metadata, each of the entity, the action and the metadata comprising one or more member elements, the entity comprising properties of the one or more member elements and being configurable for use with or to be acted upon by the action, the action comprising the one or more member elements defining input and output parameters and being configurable to act on the entity, and the metadata comprising the one or more member elements indicating one or more types of content of the first code fragment and comprising a description related to the use of the entity and the action, at least one member element representing a key element expressed as a string indicating an identity of the first content;
determining the one or more types of content of the first code fragment by reviewing the first content of the first code fragment;
associating a first set of functions with the first code fragment, the first set of functions comprising one or more functions that are provided based on the one or more types of content; and
displaying one or more functions of the first set of functions for selection by a user.

17. The system of claim 16, wherein operations further comprise:
providing the first code fragment for display; and
selectively providing one or more functions of the first set of functions for display with the code fragment.

18. The system of claim 16, wherein operations further comprise:
receiving user input associated with a function of the first set of functions; and
executing the function in response to receiving first user input.

19. The system of claim 16, wherein the first set of functions comprises an add element function.

20. The system of claim 16, wherein the first code fragment defines an entity that comprises an element that can have an association to one or more other elements, and the first set of functions comprises an add association function.

* * * * *